United States Patent Office 3,544,554
Patented Dec. 1, 1970

3,544,554
NEBULARIN DERIVATIVES
Klaus Koch, Mannheim-Feudenheim, Max Thiel, Mannheim, Kurt Stach and Wolfgang Schaumann, Mannheim-Waldhof, and Klaus Hardebeck, Ludwigshafen (Rhine), Germany, assignors to Boehringer Mannheim Gesellschaft mit beschrankter Haftung, Mannheim-Waldhof, Germany, a corporation of Germany
No Drawing. Filed June 26, 1968, Ser. No. 740,081
Claims priority, application Germany, July 1, 1967,
B 93,275
Int. Cl. C07d 51/54
U.S. Cl. 260—211.5                                7 Claims

ABSTRACT OF THE DISCLOSURE

Novel nebularin derivatives constituting valuable circulatory stimulants and corresponding to the formula:

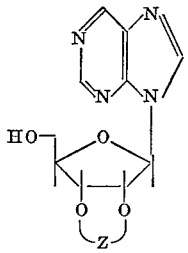

wherein Z is alkylidene containing 4 to 8 carbon atoms, cycloalkylidene containing 5 to 8 carbon atoms or aralkylidene containing 7 to 10 carbon atoms, the aryl moiety of which may be substituted by 1 or more members of the group consisting of halogen, nitro, amino, methylenedioxy, lower alkyl, alkoxy, alkylmercapto, monoalkylamino, dialkylamino and acylamino containing up to 4 carbon atoms.

---

This invention relates to derivatives of nebularin and to processes of making and using the same.

It is an object of the present invention to provide new and valuable derivatives of nebularin, said derivatives being highly effective circulation stimulating agents.

A further object of the present invention is to provide valuable therapeutic preparations comprising said new derivatives of nebularin, said therapeutic preparations being useful as circulation stimulating agents.

Another object of the present invention is to provide an advantageous, simple and very effective process of making such new and valuable nebularin derivatives.

Other objects of the present invention and advantageous features thereof will become apparent as the description proceeds.

The new and valuable nebularin derivatives as they are produced according to the present invention correspond to the following formula:

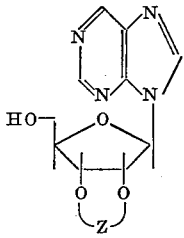

wherein Z is alkylidene containing 4–8 carbon atoms, cycloalkylidene containing 5–8 carbon atoms or aralkylidene containing 7–10 carbon atoms, the aryl group of which may be substituted by at least one of halogen, nitro, amino, methylenedioxy, lower alkyl, alkoxy, alkylmercapto, monoalkylamino, dialkylamino or acylamino containing up to 4 carbon atoms.

The compounds of this invention are useful in the preparation of medicinal agents. The compounds are useful because of their circulatory stimulating, cardiovascular and other pharmacodynamic actions.

The new nebularin derivatives according to the present invention are prepared by conventional methods. Thus, for example, the novel derivatives are prepared by reacting nebularin with an aldehyde or ketone of the formula:

$$Z=O \qquad (II)$$

wherein Z indicates the same substituent as stated above, or with the acetal or ketal thereof, in the presence of an acidic catalyst.

Alternatively a compound of the formula:

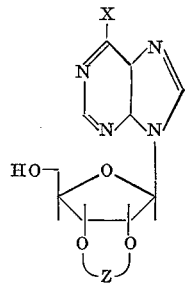

(III)

wherein Z indicates the same substituent as stated above and X is a substitutent which can readily be split off, are converted into the desired compounds (I) by reduction.

Preferably as acetal and ketal of the compounds (II), there are used the lower dialkyl derivatives, for example, the dimethyl and diethyl derivatives.

Illustrative of the acidic catalysts which can be used, there may be mentioned zinc chloride, as well as inorganic acids, aromatic sulfonic acids and the like, which are dissolved or suspended in anhydrous solvents, such as dimethyl formamide or dioxan.

As examples of substituents X which can readily be split off, there may be mentioned halogen atoms, the sulfhydryl group, as well as alkylmercapto and benzylmercapto radicals. When a diazotization agent is simultaneously present, amino groups can also be removed reductively. For the reductive removal of halogen atoms, it is preferred to carry out a pressureless hydrogenation, advantageously in the present of a base, such as triethylamine or magnesium oxide, Raney nickel having proved to be a particularly advantageous catalyst. Sulfur-containing groups can also be removed by pressureless hydrogenation in the presence of Raney nickel, the lower alcohols having been found to be especially useful as solvents in this connection.

The following examples are given for the purpose of illustrating the present invention but are in nowise to be construed as limiting the same.

EXAMPLE 1

2′,3′-O-(4-chlorobenzylidene)-nebularin 7.0 g. (17.1 mole) 6 - chloro - 2′,3′,O-(4-chlorobenzylidene)-nebularin were introduced into a mixture of 650 ml. methanol and 160 ml. water, thereafter 5 g. Raney nickel and 1 g. magnesium oxide were introduced into the mixture and hydrogenation carried out at atmospheric pressure and at ambient temperature. Over a period of 16 hours, 500 ml. (122% of theory) hydrogen were taken up. The reaction mixture was then filtered using suction, the solid residue thoroughly washed with methanol and the filtrate evaporated in a vacuum. Following recrystallization of the crystalline residue from methanol, with the addition of activated charcoal, there were obtained 2.8 g. (43.5% of theory) 2',3' - O-(4-chlorobenzylidene)-nebularin, which had a melting point of 157–159° C.; $[\alpha]_D^{20} = -126.9°$ (c.=1.19 in methanol).

The 6 - chloro - 2',3' - O-(4-chlorobenzylidene)-nebularin used as starting material was prepared in the following manner: 0.05 mol 6-chloropurine-9-β-D-riboside was slurried in 50 ml. dimethyl formamide and, at a temperature of 0–5° C., the slurry was mixed with 0.2 mol 4-chlorobenzaldehyde dimethyl acetal and 10 ml. 5 N hydrochloric acid in dioxan. The resulting reaction mixture was allowed to stand for 1–3 days at 0–5° C. and the reaction mixture then poured into an aqueous solution of ammonium bicarbonate. If the reaction product did not thereupon precipitate out in crystalline form, the reaction mixture was taken up with chloroform, the chloroform solution extracted with water, dried and evaporated. Upon triturating the residue with ether or ligroin, crystallization set in. The 6-chloro-2',3'-O-(4-chlorobenzylidene)-nebularin thereby obtained had a melting point of 192° C. (decomp.).

EXAMPLE 2

2',3'-O-(4-methyl-benzylidene)-nebularin 4.8 g. (12.35 mmole) 6 - chloro - 2',3'-O-(4-methyl-benzylidene)-nebularin were dissolved in a mixture of 350 ml. methanol and 50 ml. water. 5.0 g. Raney nickel and 0.7 g. magnesium oxide were added thereto and hydrogenation carried out at atmospheric pressure and at ambient temperature. Within a period of 4 hours, 320 ml. (108% of theory) hydrogen were taken up in the reaction. Following filtering of the reaction mixture with suction and washing the solid residue with methanol, the recovered filtrate was evaporated in a vacuum and the residue recrystallized from methanol, with the addition of activated charcoal. There were thusly obtained 1.2 g. (25% of theory) 2',3'-O-(4-methylbenzylidene)-nebularin, which had a melting point of 127–129° C.; $[\alpha]_D^{20} = -118.1°$ (c.=0.136 in dimethyl formamide).

The 6 - chloro - 2',3'-O-(4-methyl-benzylidene)-nebularin used as starting material was prepared by the procedure described in Example 1 from 6-chloropurine-9-β-D-riboside and 4-methyl-benzaldehyde dimethyl acetal. The 6 - chloro - 2',3'-O-(4-methyl-benzylidene)-nebularin had a melting point of 147–148° C.

EXAMPLE 3

2',3'-O-cyclohexylidene-nebularin

*Variant (a).*—2.0 g. (5.5 mmole) 6 - methyl-mercapto-2',3'-O-cyclohexylidene-nebularin were dissolved in 150 ml. methanol and, following the addition of 5 g. Raney nickel, boiled under reflux for 2 hours. The reaction mixture was then filtered with suction while still hot, in order to remove the catalyst. The solid residue was washed with hot methanol and the filtrate evaporated to dryness in a vacuum. There were thusly obtained 0.8 g. crude product which was dissolved in 250 ml. diisopropyl ether by heating and the resulting solution was then concentrated to 50 ml. Upon cooling, 2',3'-O-cyclohexylidene-nebularin formed and crystallized out. The yield amounted to 0.53 g. (30% of theory) and the recovered compound had a melting point of 132–133° C.

The 6 - methylmercapto - 2'3'-O-cyclohexylidene-nebularin used as starting material was prepared by the procedure described in Example 1 starting from 6-methyl-mercapto-purine-9-β-D-riboside and cyclohexanone dimethyl ketal. The starting material had a melting point of 80–84° C.

*Variant (b).*—Using a procedure analagous to that described in Example 1, and starting from 3 g. 6-chloro-2',3'-O-cyclohexylidene-nebularin, there were obtained 1.5 g. (55% of theory) 2',3' - O - cyclohexylidene - nebularin, which had a melting point of 132–133° C. The mixed melting point determined with the compound prepared according to Variant (a) evidenced no depression.

The 6 - chloro - 2',3'-O-cyclohexylidene-nebularin used as starting material was prepared by the procedure described in Example 1 from 6-chloropurine-9-β-D-riboside and cyclohexanone dimethyl ketal. It had a melting point of 198–200° C.

*Variant (c).*—2.0 g. (7.92 mmole) nebularin were slurried in 10 ml. dimethyl formamide and the resulting slurry mixed with 5.0 g. (34.7 mmole) cyclohexanone dimethyl ketal which had been dissolved in 5 ml. dioxan saturated with hydrogen chloride. The resulting reaction mixture was allowed to stand for 3 days at ambient temperature and then was poured into 100 ml. of a solution of ammonium carbonate. The latter aqueous solution was then extracted with ether and the extract evaporated. There were thusly obtained 2.8 g. of crude product which was thoroughly washed with ligroin. Following recrystallization from ether, there was obtained 1.0 g. (38% of theory) 2',3'-O-cyclohexylidene-nebularin which had a melting point of 131–132° C.

EXAMPLE 4

2',3'-O-benzylidene-nebularin 1.5 g. (5.24 mmole) 6-chloro-2',3'-O-benzylidene-nebularin were dissolved in 100 ml. ethylene glycol dimethyl ether and then subjected to pressureless hydrogenation in the presence of Raney nickel and of 0.5 g. magnesium oxide. The reaction mixture was then filtered with suction, the filtrate evaporated and the residue taken up in chloroform. The recovered chloroform solution was then washed twice with water, dried and evaporated. The residue crystallized after trituration with ether. There was thereby obtained 0.9 g. (66% of theory) 2',3'-O-benzylidene-nebularin, which had a melting point of 110–112° C.

The 6-chloro-2',3'-O-benzylidene-neubularin used as starting material was prepared by the method described in Example 1 from 6-chloropurine-9-β-D-riboside and benzaldehyde dimethyl acetal. It had a melting point of 169–172° C.

EXAMPLE 5

2',3'-O-(1-phenyl-ethylidene)-nebularin

Following a procedure analogous to that described in Example 1, 6.1 g. (15.7 mmole) 6-chloro-2',3'-O-(1-phenyl-ethylidene)-nebularin were hydrogenated at ambient temperature in the presence of Raney nickel. After the reaction mixture had been further worked up in the conventional manner, there were obtained 1.4 g. (25% of theory) 2',3'-O-(1-phenyl-ethylidene)-nebularin, which had a melting point of 50–53° C.; $[\alpha]_D^{20} = -95.9°$ (c.=0.945 in dimethyl formamide).

The 6 - chloro - 2',3' - O-(1-phenyl-ethylidene)-nebularin used as starting material was prepared using a method analogous to that described in Example 1, but starting from 6-chloro-9-β-D-purine-riboside and acetophenone dimethyl ketal. It had a melting point of 141–143° C.

EXAMPLE 6

2',3'-O-(3,4-methylenedioxy-benzylidene)-nebularin

Using a method analogous to that described in Example 1, 8.5 g. (21.0 mmole) 6-chloro-2',3'-O-(3,4-methylenedioxy-benzylidene)-nebularin were hydrogenated at ambient temperature with Raney nickel to produce 2',3'-O-(3,4 - methylenedioxybenzylidene) - nebularin. The yield amounted to 2.4 g. (30% of theory) and the compound had a melting point of 144–146° C.; $[\alpha]_D^{20} = -49.5°$ (c.=0.378 in dimethyl formamide).

The 6-chloro-2',3'-O-(3,4-methylenedioxybenzylidene)-nebularin used as starting material was prepared by following the procedure described in Example 1 starting from 6 - chloro - 9 - β-D-purine-riboside and 3,4-methylenedioxy-benzaldehyde dimethyl acetal. It had a melting point of 142–144° C.

EXAMPLE 7

2′,3′-O-(amylidene-3)-nebularin

When the hydrogenation was carried out using the procedure described in Example 1, using 7.4 g. (20.9 mmole) 6 - chloro - 2′,3′-O-(amylidene-3)-nebularin, there were obtained 1.6 g. (24% of theory) 2′,3′-O-(amylidene-3)-nebularin, which had a melting point of 117–119° C.; $[\alpha]_D^{20}=-44.3°$ (c.=1.05 in dimethyl formamide).

The 6-chloro-3′,4′-O-(amylidene-3)-nebularin used as starting material was prepared from 6-chloro-9-β-D-purineriboside and diethyl ketone dimethyl ketal. It had a melting point of 101–103° C.

EXAMPLE 8

2′,3′-O-(4-bromobenzylidene)-nebularin

The procedure described in Example 1 was followed and 5.7 g. (12.55 mmole) 6-chloro-2′,3′-O-(4-bromobenzylidene)-nebularin were converted into 1.2 g. (23% of theory) 2′,3′ - O - (4-bromobenzylidene)-nebularin, which had a melting point of 174–176° C.; $[\alpha]_D^{20}=-111.8°$ (c.=0.678 in dimethyl formamide).

The 6 - chloro - 2′,3′-O-(4-bromobenzylidene)-nebularin used as starting material was prepared by the procedure described in Example 1 from 6-chloro-9-β-D-purineriboside and 4-bromobenzaldehyde dimethyl acetal. The compound had a melting point of 182° C.

EXAMPLE 9

2′,3′-O-cycloheptylidene-nebularin

Following the method described in Example 1, 7.8 g. (20.6 mmole) 6-chloro-2′,3′-O-cycloheptylidene-neubularin were hydrogenated in the presence of Raney nickel to produce 2′,3′-O-cycloheptylidene-nebularin. There were thusly obtained 1.7 g. (24% of theory) of the compound which had a melting point of 112–114° C.; $[\alpha]_D^{20}=-49.3°$ (c.=0.493 in dimethylformamide).

The 6 - chloro - 2′,3′ - O - cycloheptylidene-nebularin used as starting material was prepared by a method analogous to that described in Example 1 from 6-chloro-9-β-D-purine-riboside and cycloheptanone dimethyl ketal. It had a melting point of 112–114° C.

EXAMPLE 10

2′,3′-O-(3-chlorobenzylidene)-nebularin 5.7 g. (13.95 mmole) 6-chloro-2′,3′-O-(3-chlorobenzylidene)-nebularin were hydrogenated by a procedure analogous to that described in Example 1 to give 1.8 g. (35% of theory) 2′,3′-O-(3-chlorobenzylidene)-nebularin, which had a melting point of 130–132° C.; $[\alpha]_D^{20}=-105.8°$ (c.=0.881 in dimethyl formamide).

For the preparation of the 6-chloro-2′,3′-O-(3-chlorobenzylidene)-nebularin used as starting material, 6- chloro-9-β-D-purine-riboside was reacted with 3-chloro-benzaldehyde dimethyl acetal in the manner described in Example 1 and had a melting point of 157–160° C.

EXAMPLE 11

2′,3′-O-(4-fluorobenzylidene)-nebularin

Following a procedure analogous to that described in Example 1, by the hydrogenation of 10.0 g. (32.0 mmole) 6-chloro-2′,3′-O-(4 - fluorobenzylidene) - nebularin, there were obtained 3.0 g. (26% of theory) 2′,3′-O-(4-fluorobenzylidene)-nebularin. It had a melting point of 175–176° C.; $[\alpha]_D^{20}=-101.0°$ (c.=1.18 in dimethyl formamide).

The 6-chloro-2′,3′-O-(4-fluorobenzylidene) - nebularin used as starting material was prepared by reacting 6-chloro-9-β-D-purine-riboside with 4-fluorobenzaldehyde dimethyl acetal in the manner described in Example 1. It had a melting point of 149–150° C.

EXAMPLE 12

2′,3′-O-(4-methoxy-benzylidene)-nebularin

Using a procedure analogous to that described in Example 1, from 4.0 g. (9.9 mmole) 6-chloro-2′,3′-O-(4-methoxy-benzylidene)-nebularin, there was obtained, by reduction in the presence of Raney nickel, 0.9 g. (25% of theory) of 2′,3′-O-(4-methoxy-benzylidene) - nebularin, which had a melting point of 122–124° C.

For the preparation of the 6-chloro-2′,3′-O-(4-methoxy-benzylidene)-nebularin used as starting material, 6-chloro-9-β-D-purine-riboside was reacted with the dimethyl acetal of anisaldehyde in the manner described in Example 1. It had a melting point of 135–140° C.

The compounds in accordance with the invention belong to the class of compounds known as nucleoside ketals. This class of compounds is characterized in that they effect simultaneously with an increase in the heart minute volume an increase in the blood circulation to the kidneys. As a result, on administration of a nucleoside ketal, a distinct increase in the excretion of sodium takes place. Therefore the increased excretion of sodium can be used to evaluate the circulation stimulating activity of new compounds falling with in the class or structurally closely related to the compounds of this class.

The test procedures involved in determining whether or not there has been an increase in sodium excretion as compared to the procedures involved in directly measuring changes in circulation dynamics are much simpler and easier to carry out. Further the determinations regarding sodium excretion can be carried out using unanesthetized animals and over considerably prolonged periods. In this connection only those compounds are considered effective whose activity is manifested over a prolonged period.

The tests were carried out using female Sprague-Dawley rats. The control sodium values were established, the test compounds were then administered orally (10 ml./kg. of an aqueous suspension containing additionally 0.5% tylose). The animals' urine was then collected for 6 hours and the sodium content again determined.

The following compounds were employed in the test procedures:

A—2′,3′-isopropylidene adenosine (comparison)
B—2′,3′-O-(4-chlorobenzylidene)-nebularin
C—2′,3′-O-(4-methylbenzylidene)-nebularin
D—2′,3′-O-benzylidene-nebularin
E—2′,3′-O-(4-bromobenzylidene)-nebularin
F—2′,3′-O-(cycloheptylidene)-nebularin
G—2′,3′-O-(3-chlorobenzylidene)-nebularin
H—2′,3′-O-(4-fluorobenzylidene)-nebularin
I—2′,3′-O-(4-methoxybenzylidene)-nebularin
J—2′,3′-O-(3,4-methylenedioxybenzylidene)-nebularin The results of the test procedures are set out in the following table.

TABLE 1.—SODIUM EXCRETION IN URINE FOLLOWING ORAL ADMINISTRATION OF ADENOSINE DERIVATIVES

| Compound | Mg./kg. | Example | Mval. Na./kg. in 6 hr. | Number of animals (rats) |
|---|---|---|---|---|
| Control | | | 0.42 | 90 |
| A | 50 | [1] | 0.36 | 15 |
| B | 25 | 1 | 4.65 | 15 |
| C | 25 | 2 | 3.42 | 15 |
| D | 25 | 4 | 2.20 | 15 |
| E | 25 | 8 | 3.52 | 15 |
| F | 25 | 9 | 0.67 | 15 |
| G | 25 | 10 | 4.56 | 15 |
| H | 25 | 11 | 2.81 | 15 |
| I | 25 | 12 | 0.82 | 15 |
| J | 25 | 6 | 0.93 | 15 |

[1] 2′,3′-isopropylidene-adenosine (comparison).

As can be seen from the table, the comparison compound 2′,3′-isopropylidene-adenosine was entirely without effect as concerns the excretion of sodium (the untreated animals excreted 0.42 mval. Na/kg. in 6 hours while the animals who received the 2',3'-isopropylidene-adenosine excreted 0.36 mval. Na/kg. in the same period). In contrast the compounds of the invention act to cause an increase in the excretion of sodium of up to 11 times that observed in the control or untreated animal. The least effective of the applicants' compounds, the 2',3'-O-(cycloheptylidene)-nebularin produced at 50% increase in sodium excretion as compared to the control. 2',3'-O-(4-chlorobenzylidene)-nebularin and 2',3'-O-(3-chlorobenzylidene)-nebularin were effective to produce an 11 fold increase in the excretion of sodium as compared to the control.

As previously indicated the adenosine derivatives of this invention are readily adapted to therapeutic use as cardio and circulatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents, or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 50–500 mg. active ingredient per dosage unit. Preferably, the compositions are compounded so that for parenteral administration, 50–200 mg. of active compound/dosage unit is present and for oral administration 200–500 mg. of compound/dosage unit.

We claim:
1. A nebularin derivative having the formula:

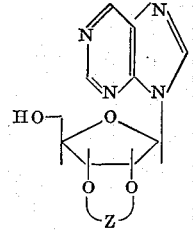

wherein Z is a member selected from the group consisting of alkylidene containing 4 to 8 carbon atoms, cycloalkylidene containing 5 to 8 carbon atoms, substituted and unsubstituted aralkylidene containing 7 to 10 carbon atoms, wherein said substitutent is a member selected from the group consisting of halogen, nitro, amino, methylenedioxy, lower alkyl, lower alkoxy, lower alkylmercapto, lower monoalkylamino, lower dialkylamino.

2. A nebularin derivative according to claim 1 designated 2',3'-O-(4-chlorobenzylidene)-nebularin.

3. A nebularin derivative according to claim 1 designated 2',3'-O-(4-methylbenzylidene)-nebularin.

4. A nebularin derivative according to claim 1 designated 2',3'-O-(4-bromobenzylidene)-nebularin.

5. A nebularin derivative according to claim 1 designated 2',3'-O-(3-chlorobenzylidene)-nebularin.

6. A nebularin derivative according to claim 1 designated 2',3'-O-(4-fluorobenzylidene)-nebularin.

7. A nebularin derivative according to claim 1 designated 2',3'-O-benzylidene-nebularin.

References Cited
UNITED STATES PATENTS

| | | | |
|---|---|---|---|
| 3,014,900 | 12/1961 | Schroeder | 260—211.5 |
| 3,208,997 | 9/1965 | Iwai et al. | 260—211.5 |
| 3,225,029 | 12/1965 | Yamaoka | 260—211.5 |
| 3,346,562 | 10/1967 | Honjo et al. | 260—211.5 |

LEWIS GOTTS, Primary Examiner

J. R. BROWN, Assistant Examiner

U.S. Cl. X.R.

424—180